(12) United States Patent
Bourdaillet et al.

(10) Patent No.: US 9,330,422 B2
(45) Date of Patent: May 3, 2016

(54) CONVERSATION ANALYSIS OF ASYNCHRONOUS DECENTRALIZED MEDIA

(71) Applicants: Xerox Corporation, Norwalk, CT (US); Palo Alto Research Center Incorporated, Palo Alto, CA (US)

(72) Inventors: Julien Jean Lucien Bourdaillet, Rochester, NY (US); Wei Peng, Fremont, CA (US); Tong Sun, Penfield, NY (US); Margaret Helen Szymanski, Santa Clara, CA (US)

(73) Assignee: XEROX CORPORATION, Norwalk, CT (US)

( * ) Notice: Subject to any disclaimer, the term of this patent is extended or adjusted under 35 U.S.C. 154(b) by 499 days.

(21) Appl. No.: 13/833,858

(22) Filed: Mar. 15, 2013

(65) Prior Publication Data

US 2014/0280621 A1    Sep. 18, 2014

(51) Int. Cl.
*G06Q 50/00* (2012.01)
*G06Q 10/10* (2012.01)
*H04L 29/06* (2006.01)

(52) U.S. Cl.
CPC .............. *G06Q 50/01* (2013.01); *G06Q 10/107* (2013.01); *H04L 65/40* (2013.01)

(58) Field of Classification Search
CPC ................ H04L 12/588; H04L 65/40–65/403; H04L 51/32; G06Q 30/00–30/02; G06Q 50/01; G06Q 10/107
See application file for complete search history.

(56) References Cited

U.S. PATENT DOCUMENTS

| | | | |
|---|---|---|---|
| 2010/0332477 A1* | 12/2010 | Jeffs et al. ..................... | 707/738 |
| 2012/0130771 A1* | 5/2012 | Kannan et al. ................ | 705/7.32 |
| 2013/0262168 A1* | 10/2013 | Makanawala et al. ........ | 705/7.14 |
| 2014/0074728 A1* | 3/2014 | Margulies ..................... | 705/304 |
| 2014/0237057 A1* | 8/2014 | Khodorenko ................. | 709/206 |
| 2014/0255895 A1* | 9/2014 | Shaffer ................... | G09B 7/02 434/350 |

* cited by examiner

*Primary Examiner* — Nicholas Taylor
*Assistant Examiner* — Clayton R Williams
(74) *Attorney, Agent, or Firm* — Fay Sharpe LLP

(57) ABSTRACT

The present disclosure provides a system that allows for the real-time and online monitoring of the exchanges between customers and a CRM team over social media. While crawling all messages exchanged over the social media by customers and CRM team, the system aggregates related messages exchanged between a given customer and the CRM team into a conversation. The system includes a linguistic framework for the analysis of conversations (based on the two linguistic theories of dialog acts and conversation analysis) to label the nature of the messages in a conversation or thread.

20 Claims, 1 Drawing Sheet

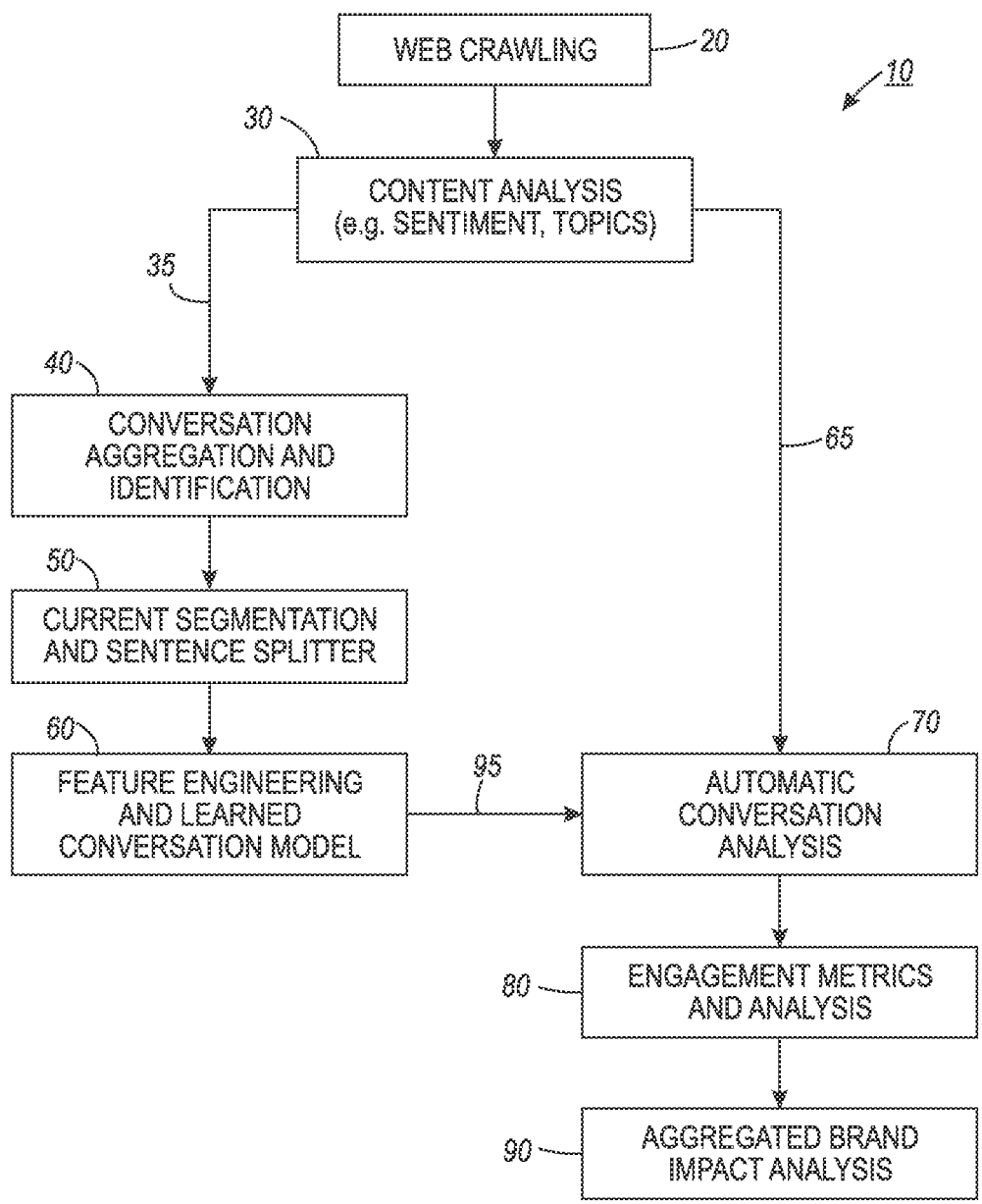

CONVERSATION ANALYSIS OF ASYNCHRONOUS DECENTRALIZED MEDIA

BACKGROUND

Media, for example social media, is consistently growing all around the world. Monitoring the engagement between customers and customer relations representatives (i.e. agents) towards brands and companies is a global market.

Currently, organizations offer social customer relations management (CRM) services to extend their traditional call-center services. Typically, the social CRM is composed of two separate teams: one is for social media listening and monitoring wherein the social posts are browsed or stored; and, another is for engagement where agents interact with customers to resolve their issues. These social CRM processes are currently very human-intensive and error-prone. And there is no existing technique or tools to track the engagement conversations and measure the effectiveness of these engagements. What is needed, in order to bring a competitive advantage, is to aggregate these conversation-level engagement analyses into a brand-based impact analysis, thereby providing an aggregated executive view into the valuable impact generated by social CRM services.

With the rise of Facebook® and Twitter®, social media are becoming more and more pervasive in our lives. For its IPO, Facebook claims 900 million users around the world, one of two internauts, and Twitter has 140 million users in 2012 generating 340 million tweets daily. Social media have risen to an essential position and are now major actors of the Internet.

By essence, social media is a platform that connects millions of users together, allowing them to exchange and share common interests, topics or events. Whereas these platforms were developed for private usage among users, they are now invested by private companies as a new communication and marketing vector. For private companies, social media exhibits a number of desirable features: grouping a huge number of internauts and as such representing an essential vector for attaining customers; providing valuable information for targeting customized marketing campaigns; and, continuing growth for reaching potential customers and obtaining feedback form same.

SUMMARY

The present disclosure provides a system that allows for the real-time and online monitoring of the exchanges between customers and a CRM team over social media. While crawling all messages exchanged over the social media by customers and CRM team, the system aggregates related messages exchanged between a given customer and the CRM team into a conversation. The system includes a linguistic framework for the analysis of conversations (based on the two linguistic theories of dialog acts and conversation analysis) to label the nature of the messages in a conversation or thread. The conversations can be labeled according to their engagement status. The aforementioned enables the system to compute in real time, and online, a set of metrics concerning the conversations (i.e. conversion rate, resolution rate, happy customer rate, etc.). Some of the metrics are adapted from call center metrics, while others are purely content based relying on the linguistic framework.

The present disclosure further provides a method for monitoring exchanges between customers and customer relations representatives over social media, comprising: querying historical linguistic data sets; extracting conversations between the customers and the customer relations representatives; wherein extracting conversations uses a customer relations representative identifier and extracts all messages sent by the customer relations representative identifier or to the customer relations representative identifier; wherein the messages are grouped by the customer using a customer associated identifier; ordering chronologically a list of all the messages by customer associated identifier; extracting from the list the messages related to an individual subject; aggregating the messages into pseudo synchronous conversations; separating each pseudo synchronous conversation into one or more segments and associating one or more classes to each segment; labeling each the segment in the conversation according to a conversation analysis; labeling each the segment in the conversation according to an engagement analysis; and, computing real time online metrics for CRM.

The present disclosure yet further provides a method for monitoring exchanges between customers and customer relations representatives over social media, comprising: querying historical linguistic data sets; extracting conversations between the customers and the customer relations representatives; wherein extracting conversations uses a customer relations representative identifier and extracts all messages sent by the customer relations representative identifier or to the customer relations representative identifier; wherein the messages are grouped by the customer using a customer associated identifier; ordering chronologically a list of all the messages by customer associated identifier; extracting from the list the messages related to an individual subject; aggregating the messages into pseudo synchronous conversations; separating each pseudo synchronous conversation into one or more segments and associating one or more classes to each segment; labeling each segment in the conversation according to conversation analysis; and, computing engagement metrics from the labels of each the segment, wherein the engagement metrics are selected from the group consisting of: resolution rate, properly handled threads rate, customer hang-up, conversion rate, and happy customer rate.

BRIEF DESCRIPTION OF THE DRAWINGS

FIG. 1 is a diagram of a method for monitoring exchanges between customers and customer relations representatives over social media.

DETAILED DESCRIPTION

Private companies' CRM is typically dedicated to manage the relations between the company and its customers. Traditionally, this is done by customer care agents that address customer queries via telephone calls, usually inside a call center. These call centers are either owned by the company or outsourced to other companies. In the last decade, two new media sources of emails and synchronous online chat have been handled by CRM teams. These two media are becoming more and more used, but remain far less used than phone calls. In the most recent past few years, the new communications vectors provided by social media (i.e. Facebook and Twitter), have also gained the attention of CRM teams.

Due to the novelty of social media, there is a lack of available tools that would allow CRM teams to properly handle CRM via social media. For Facebook, private companies usually manage one Facebook page that serves as a portal for the brand on Facebook, and CRM teams are charged with manually monitoring this page to handle user requests. For Twitter, the problem is even harder due to the decentralized nature of this network. Twitter does not have a central place to address users' requests. CRM teams have to search the tweets exchanged over the network in order to identify the ones related to the brand they manage. Further, in addition to being decentralized, tweets are asynchronous. This renders their management very difficult for CRM teams. It's hard to have an asynchronous conversation between a customer and the CRM team since it can last several hours, or even days. When replying to tweets in such long conversations, agents have to take into account the previous messages exchanged between them which are not always easily available without a manual search of historical tweets.

The present disclosure provides for novel methods directed towards CRM for asynchronous decentralized social media addressing the above challenges. The methods enable real time CRM between CRM teams and customers on social media, especially asynchronous decentralized ones like Twitter. The methods provide techniques for automatically aggregating asynchronous tweets into pseudo-synchronous threads or conversations. The techniques can label conversations according to a conversation analysis, dialog acts, and/or other theories. The methods further allow real time, and online, assessment of the engagement status of a conversation between customers and CRM team. A set of metrics can be established that allows analysis of the effectiveness of the CRM team engagement with customers.

For illustration purposes. the following descriptions are based on a message, conversation, or twitter data set, but the proposed system and techniques are applicable to a wide variety of social media datasets, such as Facebook®, LinkedIn®, Youtube®, Google+®, etc. Therefore, the messages, conversations, and tweets can be generally extended to any social posts or comments.

As mentioned earlier, 340 million tweets are exchanged daily over the Twitter network. From those tweets, those related to a company or brands have to be filtered in order to keep only those which are interesting to the company's CRM team. For doing so, one can rely on the application programming interface (API) provided by Twitter. This API allows querying of the database that stores tweets that have been previously exchanged. The system, to be described hereinafter, can rely on this API to query these historical tweets. Since the volume of daily messages and/or tweets can be large, some filter criteria have to be specified. Since we are interested in CRM related to a brand or a company, the filtering criterion can be keywords that describe the brand or the company, i.e., the brand or company names themselves, or any keywords commonly associated with them. Once these keywords are specified, they can be used to query the historical tweets using the Tweeter API.

The huge volumes of daily data make it hard to manage such a quantity of data. One can implement a crawler as a daemon, i.e. a program that runs continuously on a machine. On a regular basis, i.e. every hour or less, the daemon can query the Twitter API using the keywords in order to retrieve the last tweets exchanged and related to the company. These tweets can be stored in a local database for further processing. This continuous crawling of new tweets allows almost real-time retrieval of new data.

After the relevant tweets are crawled, there are a sequence of analysis steps that can be conducted. Most commonly the sentiment labels and topic labels can be classified following some natural language processing (NLP) procedures. These sentiment and topic labels can be used to route the tweets to proper agents for further engagement if necessary.

Messages exchanged using Twitter, i.e. tweets, are exchanged over an asynchronous decentralized network. Since they are public, they are accessible to any Twitter user, and especially those who are connected via a 'follow' relation. The asynchronous and decentralized nature of the tweets makes it relatively difficult to follow a serious and technical discussion over a period of time that spans several days or hours. The present disclosure proposes a system that extracts automatically conversations or threads between customers and the care representatives of an organization or company.

The tweets retrieved by the crawler and stored in the local database represent raw data. The tweets are not linked together as a conversation because the Twitter API does not provide such functionality. For linking conversations, the system includes two types of twitter users: the CRM agents whose Twitter identifiers are known by the system; and, customers whose identifiers are unknown. For each CRM identifier, the system extracts all the tweets sent by the CRM identifier or to the CRM identifier. These tweets can then be grouped by customers using their identifier, and ordered chronologically. This provides for each customer, a chronological list of all tweets exchanged with any CRM agent or representative over a period of time. Further, the system can obtain as many lists as there are customers who exchanged with the CRM agents of the CRM team.

The chronological lists are ordered lists of tweets exchanged between a customer and a CRM agent. These lists are raw lists and contain all the tweets exchanged between two accounts over a given period of time. In order to exploit the lists for CRM, the system enables another structure level: extracting from the raw list the different conversations related to a given subject/problem exchanged between the customer and a CRM agent. It is to be appreciated that if the customer encountered several problems over the given period of time, several conversations may have occurred, each of them related to a specific topic. For the users of the system, i.e. the CRM team, it is more informative to have a list of the different conversations exchanged between the CRM team and the customer, rather than the raw list where the conversations are indistinctly mixed.

In order to extract the conversations from the raw list of tweets between a customer and a CRM agent, the system needs to find the beginning and the end of each conversation in the raw list. To do that, a simple heuristic can be utilized that considers the time period elapsed between two consecutive tweets in the raw list. For example, if the time difference between two consecutive tweets is larger than a predeterminable time period (i.e. three days), then the consecutive tweets are considered to belong to two different conversations. If the time difference is less than the predeterminable time period (i.e. three days), then two consecutive tweets belong to the same conversation. This exemplary heuristic allows automatic extraction of the conversations exchanged between a customer account and the CRM team. In addition to the time-distance, the conversations can be identified based on the similarity of the topics. Usually, similar topics discussed in a certain time period very likely belong to the same conversation, while different topics discussed even within a short time period might belong to different conversations.

A subsequent process can aggregate asynchronous tweets exchanged in a decentralized manner into pseudo-synchronous conversations between customers and CRM agents. Once the aggregation is done, the whole conversation related to the customer problem is obtained. Since the conversation is complete, it can then be considered as a pseudo-synchronous conversation and processed as such.

For analyzing these conversations, the system can utilize the linguistic theories of dialog acts or conversation analysis. These linguistic theories are commonly used in NLP. In these linguistic theories one typically considers each exchange in a conversation and assigns them a category that describes the message exchanged. Originally, these theories were developed for analyzing synchronous conversations, like face to face dialogues, phone conversations, or online chat conversation. The aggregation process described above enables the use of these linguistic theories and frameworks as if the conversations were synchronous.

After manual examination of tweet conversations, an exemplary set of twelve classes was defined that categorize a tweet inside a conversation for automatic conversation labeling and analysis (refer to Table 1 below).

TABLE 1

| Category | Description | Example |
| --- | --- | --- |
| Complaint | When a customer complains | @vmucare I've sent an email, but I am absolutely disgusted with the customer care I am receiving |
| Apology | When an agent apologies | @kristenmchugh22 I do apologize for the inconvenience. |
| Answer | When someone answers a request | @BoostCare yea, allow my texts and calls to go out |
| Receipt | When someone acknowledges receipt | @VMUcare ok |
| Compliment | When someone sends a compliment | I still love VM and my intercept |
| Response to positivity | When someone acknowledges a previous positive message | @harryruiz No problem! |
| Request | When someone requests information | Please help me out. |
| Greeting | Greetings | @LucusHughes13 Hi there! |
| Thank | When someone expresses thanks | Thank you for being so patient. |
| Announcement | When a customer announces an information | @VMUcare phone stolen last night |
| Solved | When a message clearly states that a problem is solved | Close one! |
| Other | Any other message | Wow! |

A message or tweet sent by a customer or a CRM agent can convey several pieces of information that cover several of the categories defined above. For example, in a single tweet an agent can respond to a complaint by: i) greeting the customer; ii) then apologizing for the problem; and, iii) requesting more detailed information concerning the problem. According to the conversation analysis theory, such a tweet would contain three segments being labels of greeting, apology, and request, respectively. When manually labeling a conversation, a human can quite easily segment the different parts of a tweet. But for an automated system, what is needed is an automatic process for doing the segmentation. For doing so, the present disclosure proposes to automatically segment the tweets and/or split sentences. A sentence splitter algorithm can split sentences according to hard punctuation marks for example, or according to a more sophisticated set of rules. Thus, each tweet in a conversation can be split into several segments resulting in each conversation being composed of consecutive tweet segments.

For each tweet segment in a conversation, the system can further automatically associate a set of features to it. In one exemplary arrangement, these features are defined in the table below (refer to Table 2).

As described above, the system can associate a vector of features to each tweet segment in a conversation. It is then straightforward to use a supervised classifier to automatically categorize tweet segments. One manner in doing this is to manually label a set of test data conversations which will serve as training data. Multiple human annotators can be asked to label independently the set of test data tweet segments organized in conversations. After the annotation, at least a majority of the annotators should agree on all of the segments in order to reconcile all the segment labels and provide a framework and control criteria for training other annotators.

The linguistic framework discussed above enables engineering of a system that labels each tweet segment in a thread with dialog act labels for automatic engagement analysis. The framework and system can be used to label each tweet segment according to a second task defined as engagement labeling. For example, each tweet segment can comprise one of a set of four possible classes that reflect the status of a tweet exchanged between a customer and a CRM agent (refer to Table 3 below). These classes give information of how the

TABLE 2

| Feature | Type | Description |
| --- | --- | --- |
| Word 1-grams and 2-grams | 1 integer/n-gram | The count of n-grams of words that compose the tweet segment |
| Segment position in thread | Integer | Position of the tweet in the thread |
| Segment position in tweet | Integer | Position of the segment in the tweet |
| Sender | Boolean | CRM agent or customer |
| Contains email | Boolean | Presence of an email in the tweet segment |
| # upper case | Integer | % of letters in upper case in the tweet segment |
| # punctuation | Integer | % of punctuation marks in the tweet segment |
| # Special punctuation | Integer | % of ! and ? punctuation marks, i.e. !!!!!??? |
| Positive Sentiment | Integer | Positive sentiment score of the ngrams |
| Negative Sentiment | Integer | Negative sentiment score of the ngrams |
| Category of Previous Segment | 1 Boolean/category | The category of the previous segment |
| Category of Previous Tweet/Same Author | 1 Boolean/category | The category of the last segment of the previous tweet of the same author |
| Category of Previous Tweet/Other Author | 1 Boolean/category | The category of the last segment of the previous tweet of the other author | problem open by the customer is perceived at the time of the conversation. Since the status of the conversation can be updated after receiving each tweet, the system proposes to label each tweet that arrives in a conversation. Also, as in the previous step, prior to labeling, each tweet is separated into segments. This allows a finer-grain classification of the tweets that may contain several engagement labels.

TABLE 3

| Category | Description | Example |
| --- | --- | --- |
| Open | When a conversation is ongoing and a further message is expected to follow | @Daleglass07 Hi, that's not good. |
| Solved | When the current message solves the problem mentioned in the current conversation, without requiring any further message | No, your payment would just increase by $5 a month and you will keep your Shrinkage milestone. |
| Closed | When the current message closes the conversation, even if the problem is not solved | @UNCRWNDKINGS We would rally hate to see you go. |
| Change Channel | When the CRM agent asks the customer to change channel by sending an email or a direct message. In this case, the conversation halts since further exchanges are on other private channels. | Can you please email me directly at bstsocialcare@sprint.com and I will gladly look into this. |

The features used can be the same as in Table 2 for conversation analysis, except the last three features regarding the categories of previous segment. In this case, the categories relate to the engagement categories (and not the conversation categories as previously discussed).

As for conversation analysis, three annotators (as a control group) were asked to label 2785 tweet segments organized in conversations with the four engagement labels. After the annotation, all three annotators agreed on 76.34% of the segments, and on 22.66% of the segments at least two annotators agreed. For the remaining 1% of the segments, the three annotators revised together their annotations in order to achieve at least a majority agreement. In the end, all segment labels were reconciled. Using this control group training data, and after computing the feature vector for each segment, a supervised classifier can be trained.

The following proposes adapting from the call center literature a set of metrics for the social media framework. In call centers, traditionally some metrics are used to monitor the activity of the agents answering phone calls of customers, such as call length, wait time, hold time, hang-ups, etc. These metrics give an overview of how the agents handle calls. The present disclosure uses a linguistic framework of dialog acts and organizes messages in threads in order to compute a set of metrics that are closely related to the traditional call center metrics. Table 4 below details an exemplary set of metrics the system is able to produce in real-time.

TABLE 4

| Metrics | Description |
| --- | --- |
| Message Thread length | Number of messages in a thread |
| Time Thread length | Time difference between first and last message in a thread |
| First Wait time | Time difference between customer's first message in a thread and agent response |
| Average Wait time | Average time difference between customer messages and agents immediately following response |
| Arrival rate | Message arrival rate per customer |

Contrary to traditional call center monitoring, the present system has access to the content of the messages exchanged over the social media between customers and CRM agents. Further, since the system relies on the linguistic framework of dialog acts, it is able to analyze the contents of the conversations as described above. This analysis allows proposing several engagement metrics which can be based on the content of the messages, as well as, real time computation. Table 5 below details some exemplary content-based engagement metrics. Additional metrics can be added or customized based on the needs of the CRM.

TABLE 5

| Metrics | Description |
| --- | --- |
| Resolution rate | % of threads whose first message was label OPEN and last as SOLVED |
| Properly handled threads rate | % of threads whose first message was label OPEN and last as SOLVED, CLOSED or CHANGE CHANNEL |
| Customer "hang-up" | % of threads whose tail contains at least a customer message labeled as COMPLAINT and no message labeled as THANK, RESPOS, SOLVED or COMPLIMENT |
| Conversation rate | % of threads whose head contains a customer message labeled as COMPLAINT or REQUEST and tail contains a message labeled as THANK, RESPOS, SOLVED, COMPLIMENT or ANSWER |

TABLE 5-continued

| Metrics | Description |
|---|---|
| Happy customer rate | % of threads that contains at least a customer message labeled as COMPLIMENT or SOLVED and no message labeled as COMPLAINT |

While the conversation level of engagement analysis is important to assess the agent's performance or identify the detail issues in customer care services for further improvement, there is also a need to provide an aggregated analysis to assess the valuable impact generated by the social CRM services for a business brand. For instance, the impact analysis includes the overall response time (e.g. how quick the issues get detected and resolved) and customer satisfaction (e.g. a conversation that starts with a negative sentiment but finishes with a good sentiment) can be easily aggregated for each brand. This brand-based impact analysis is an important component in the social CRM report, but due to lack of conversation level engagement analysis, most existing reports are constructed manually which are unable to provide detailed drill-down views.

FIG. 1 summarizes the system components and processes embodied in the present disclosure. The system 10 can start with initiation of a web crawler 20 and then proceed to content analysis 30. Content analysis 30 can comprise online 35 processes of conversation aggregation and identification 40, content segmentation and sentence splitting 50, and feature engineering and learned conversation model 60; wherein the online processes can be built from the learnt model for conversation analysis. Content analysis 30 can further comprise real-time 65 processes of automatic conversation analysis 70, engagement metrics and analysis 80, and aggregated brand impact analysis 90 The learnt conversation model can be applied 95 in the automatic conversation analysis conducted in real-time.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for computing online metrics for customer relations management, comprising:
   querying historical linguistic data sets of exchanges between customers and customer relations representatives over social media;
   extracting from the historical linguistic data sets conversations between said customers and said customer relations representatives;
   wherein extracting conversations uses a customer relations representative identifier and extracts all messages sent by said customer relations representative identifier or to said customer relations representative identifier;
   wherein said messages are grouped by a customer using a customer associated identifier;
   ordering chronologically a list of all said messages by said customer associated identifier;
   extracting from the list of all said messages groups of messages, wherein each group of messages is related to an individual subject;
   aggregating said groups of messages into pseudo synchronous conversations;
   separating each pseudo synchronous conversation of the pseudo synchronous conversations into one or more segments and associating one or more classes to each of the one or more segments;
   labeling each said segment in said each pseudo synchronous conversation according to a conversation analysis; and,
   labeling each said segment in said each pseudo synchronous conversation according to an engagement analysis.

2. The method of claim 1, wherein said data sets are asynchronous and decentralized.

3. The method of claim 1, further comprising:
   obtaining as many lists as there are customers.

4. The method of claim 1, wherein if the lapsed time between consecutive messages is greater than or equal to three days, then identify pseudo conversation as two different conversations.

5. The method of claim 1, wherein if the lapsed time between consecutive messages is less than three days, then identify pseudo conversation as same conversation.

6. The method of claim 1, wherein each said labeling according to conversation analysis is selected from the group consisting of: complaint, apology, answer, receipt, compliment, response to positivity, request, greeting, thank, announcement, solved, and other.

7. The method of claim 1, wherein each said labeling according to said engagement analysis is selected from the group consisting of: open, solved, closed, and change channel.

8. The method of claim 1, further comprising:
   producing metrics from the segments, wherein said metrics are selected from the group consisting of: message thread length, time thread length, first wait time, average wait time, and arrival rate.

9. The method of claim 1, further comprising:
   computing engagement metrics from said labels of each said segment, wherein said engagement metrics are selected from the group consisting of: resolution rate, properly handled threads rate, customer hang-up, conversion rate, and happy customer rate.

10. A method comprising:
    querying historical linguistic data sets of exchanges between customers and customer relations representatives over social media;
    extracting conversations from the historical linguistic data sets between said customers and said customer relations representatives;
    wherein extracting conversations uses a customer relations representative identifier and extracts all messages sent by said customer relations representative identifier or to said customer relations representative identifier;
    wherein said messages are grouped by a customer using a customer associated identifier;
    ordering chronologically a list of all said messages by said customer associated identifier;
    extracting from the list of all said messages groups of messages, wherein each group of messages is related to an individual subject;

aggregating said groups of messages into pseudo synchronous conversations;
separating each pseudo synchronous conversation of the pseudo synchronous conversations into one or more segments and associating one or more classes to each of the one or more segments;
labeling each segment in said each pseudo synchronous conversation according to conversation analysis; and,
computing engagement metrics from said labels of each said segment, wherein said engagement metrics are selected from the group consisting of: resolution rate, properly handled threads rate, customer hang-up, conversion rate, and happy customer rate.

11. The method of claim 10, wherein said data sets are asynchronous and decentralized.

12. The method of claim 10, further comprising:
obtaining as many lists as there are customers.

13. The method of claim 10, wherein if the lapsed time between consecutive messages is greater than or equal to three days, then identify pseudo conversation as two different conversations.

14. The method of claim 10, wherein if the lapsed time between consecutive messages is less than three days, then identify pseudo conversation as same conversation.

15. The method of claim 10, wherein each said labeling according to engagement analysis is selected from the group consisting of: open, solved, closed, and change channel.

16. The method of claim 10, further comprising:
producing metrics from the segments, wherein said metrics are selected from the group consisting of: message thread length, time thread length, first wait time, average wait time, and arrival rate.

17. The method of claim 10, wherein each said labeling according to conversation analysis is selected from the group consisting of: complaint, apology, answer, receipt, compliment, response to positivity, request, greeting, thank, announcement, solved, and other.

18. A non-transitory machine-readable storage medium having embodied thereon instructions executable by one or more machines to perform operations, comprising:
querying historical linguistic data sets;
extracting from the historical linguistic data sets conversations between customers and customer relations representatives;
wherein extracting the conversations uses a customer relations representative identifier and extracts all messages sent by said customer relations representative identifier or to said customer relations representative identifier;
wherein said messages are grouped by a customer using a customer associated identifier;
ordering chronologically a list of all said messages by said customer associated identifier;
extracting from the list of all said messages groups of messages, wherein each group of messages is related to an individual subject;
aggregating said groups of messages into pseudo synchronous conversations;
separating each pseudo synchronous conversation of the pseudo synchronous conversations into one or more segments and associating one or more classes to each of the one or more segments;
labeling each said segment in said each pseudo synchronous conversation according to a conversation analysis;
labeling each said segment in said each pseudo synchronous conversation according to an engagement analysis;
wherein said historical linguistic data sets are asynchronous and decentralized; and,
wherein if a lapsed time between consecutive messages is greater than or equal to a predeterminable time period, then identify a pseudo conversation as two different conversations.

19. The method of claim 18, further comprising:
computing engagement metrics from said labels of each said segment, wherein said engagement metrics are selected from the group consisting of: resolution rate, properly handled threads rate, customer hang-up, conversion rate, and happy customer rate.

20. The method of claim 19, wherein each said labeling according to said engagement analysis is selected from the group consisting of: open, solved, closed, and change channel.

* * * * *